United States Patent [19]

Virupaksha

[11] Patent Number: 4,912,765

[45] Date of Patent: Mar. 27, 1990

[54] VOICE BAND DATA RATE DETECTOR

[75] Inventor: Krishnamoorthy Virupaksha, Rockville, Md.

[73] Assignee: Communications Satellite Corporation, Washington, D.C.

[21] Appl. No.: 250,188

[22] Filed: Sep. 28, 1988

[51] Int. Cl.⁴ .............................................. G10L 9/12
[52] U.S. Cl. .................................................... 381/31
[58] Field of Search .............. 370/84; 375/122, 25–34; 381/29–40

[56] References Cited

U.S. PATENT DOCUMENTS

| | | | |
|---|---|---|---|
| 3,878,334 | 4/1975 | Halpern | 178/69.5 R |
| 4,052,558 | 10/1977 | Patterson | 178/68 |
| 4,330,689 | 5/1982 | Kang et al. | 370/84 |
| 4,457,013 | 6/1984 | Castellino et al. | 381/46 |
| 4,556,866 | 12/1985 | Gorecki | 340/310 A |
| 4,663,623 | 5/1987 | Lax et al. | 340/825.44 |
| 4,756,007 | 7/1988 | Qureshi et al. | 370/84 |

OTHER PUBLICATIONS

Shwartz, "Information Transmission, Modulation, and Noise" McGraw-Hill, 1959, pp. 1–14.

Primary Examiner—David L. Clark
Assistant Examiner—John A. Merecki
Attorney, Agent, or Firm—Sughrue, Mion, Zinn, Macpeak & Seas

[57] ABSTRACT

An apparatus for detecting the modulation rate of voice-band data signals. The detector determines the level occupancy $L_p$, the partial entropy $E_p$, and the zero-crossing count $N_{zc}$ for the input signal and compares these values with threshold values to determine the data rate.

15 Claims, 2 Drawing Sheets

VOICE BAND DATA RATE DETECTOR

BACKGROUND OF THE INVENTION

1. Field of the Invention

The present invention relates to an apparatus for detecting the modulation rate of voice-band data signals. Three measures are used to determine the data rate. These are the level occupancy, $L_p$, the partial entropy, $E_p$, and the zero-crossings, $N_{zc}$. By first normalizing the signal level and then using predetermined thresholds for each of these measures, the data rate can be determined with a high degree of accuracy.

2. Description of the Prior Art

There is an increasing need to carry high speed data over voice channels. Recently, Low Rate Encoders (LRE) operating at 32 kbit/s or lower rates have been used with increasing frequency to transmit speech signals. However, most 32 kbit/s LRE's cannot support transmission of data signals modulated at rates greater than 4800 bps without introducing high bit error rates (BER greater than $10^{-3}$). Even at data rates equal to 4800 bps, the performance of 32 kbit/s LRE's is sometimes only marginal (BER=$10^{-5}$) depending on the analog impairments on the line. Therefore, it may be necessary to use higher transmission rates such as 40 kbit/s LRE rate or 64 kbit/s PCM to carry data signals whose modulation rates are equal to or greater than 4800 bps. A Data Rate Detector (DRD) may be required so that an adequate LRE transmission rate can be selected to carry a given data rate.

SUMMARY OF THE INVENTION

The primary object of the present invention is to provide a date rate detector that can determine the rate of a data signal and then assign a channel encoder which is adequate to support the transmission of the data signal.

Another object of the present invention is to provide a data rate detector which can detect data signal rates which are equal to, less than or greater than 4800 bps.

Still another object of the present invention is to provide a data rate detector which uses Adaptive Differential PCM (ADPCM) output levels for partial entropy computations in order to discriminate data rates.

Yet another object of the present invention is to provide a data rate detector which uses ADPCM output level occupancy calculations to detect data rates.

Yet still another object of the present invention is to provide a data rate detector which utilizes zero-crossings to distinguish data rates.

Still another object of the present invention is to provide a data rate detector which makes efficient use of transmission channel capacity.

A further object of the present invention is to provide a data rate detector which employs embedded data signal level normalization.

An even further object of the present invention is to provide a data rate detector in which implementation may be carried out using digital signal processing chips. (DSP)

A still further object of the present invention is to provide a data rate detector that has an easy handshake capability with other hardware through the use of DSPs.

An even still further object of the present invention is to provide a data rate detector which can be used in a single or multichannel environment.

The invention disclosed herein is capable of performing the data rate detection on a class of modems specified in the CCITT Recommendations e.g., V.22 (1200 bps), V.23 (1200/600 bps), V.27ter (4800/2400 bps) and V.29 (9600 bps). The data rate detector exhibited a high degree of accuracy (greater than 99%) in classifying the data rates.

The apparatus according to present invention determines the rate of a data signal and then assigns an adequate channel encoder operating at an appropriate signal rate (e.g. 32 or 40 kbit/s), in order to support the transmission of the data signal. For data rates less than or equal to a predetermined rate (e.g. 4800 bps) it is adequate to use a low rate encoder (LRE) such as a 32 kbit/s ADPCM, while for data rates greater than the predetermined rate it may be necessary to use a higher rate encoder (e.g. 40 kbit/s LRE or 64 kbit/s PCM).

The data input signal is used to compute the number of zero-crossings $N_{zc}$ of the carrier frequency and at the same time the input signal is normalized. An Adaptive Differential PCM encoder receives the normalized data input signal and produces a 4 bit/sample ADPCM signal and transmits the zero-crossing count to a zero-crossing comparator. The magnitude bits of the 4 bit/sample ADPCM signal are utilized in four counters to determine the number of times the chosen four quantizer levels are exercised. A level occupancy circuit receives the output of the level counters and distinguishes QAM modem signals. At the same time, a partial entropy circuit computes the partial entropy $E_p$ based on the values in the four counters. Then, $L_p$, $E_p$ and $N_{zc}$ are used to determine the data rate.

The above and other objects, features and advantages of the present invention will become apparent from the following detailed description taken with the accompanying drawings.

DETAILED DESCRIPTION OF THE PREFERRED EMBODIMENTS

The data rate detector described herein derives its signal for data rate detection in such a way that it does not interfere with the through path of the signal transmission. Initially, the data signal is expected to be carried at a high enough channel rate to support the data rate. After the data rate has been detected the channel rate can be lowered, if warranted, thereby utilizing the channel capacity more efficiently. The following is a description of the data rate detector.

The nominal level used for the transmission of data signals is −13 dBmO. Due to circuit loss variations in the network, the data signal level presented to the data rate detector may not always be −13 dBmO. However, some of the data rate detection techniques require constant data level input for them to operate accurately. Therefore, it is necessary to normalize the data signal level before it is applied to the data rate detector. The data rate detection as well as the signal power normalization calculations are done using Digital Signal Processing (DSP) chips. In the preferred embodiment of the present invention, NEC μPD 77P20 DSP chips are used to implement the data rate detector.

Figure 1:
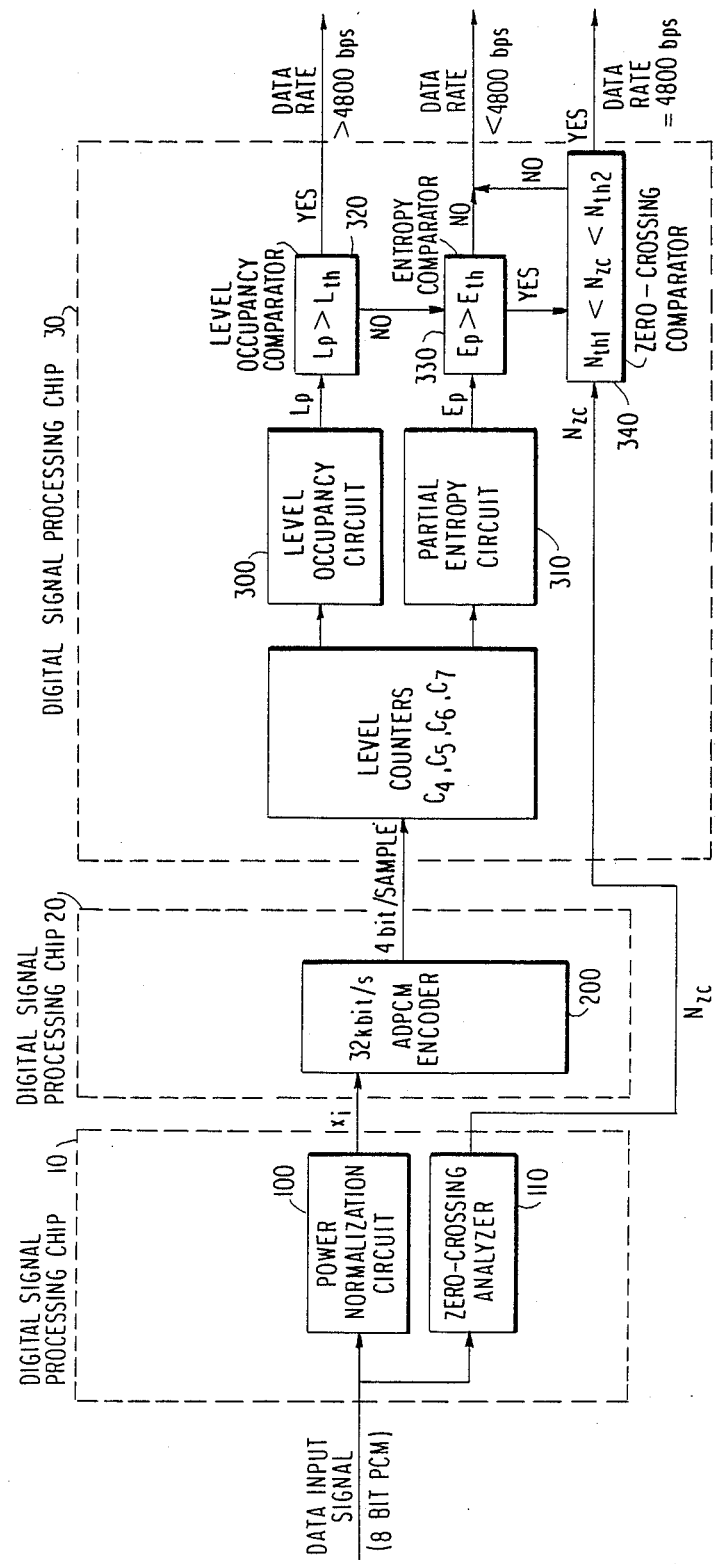
FIG. 1 is a schematic block diagram showing an embodiment of the present invention.

Referring to FIG. 1, prior to data signal power normalization, the data signal (which is band limited to 3.4 kHz and sampled at 8 kHz), is digitized using an 8-bit PCM A-law encoder (not shown). The 8 bit PCM input signal is applied to the power normalization circuit 100 in digital signal processing chip 10. The 8 bit PCM signal is amplified or attenuated by using a look up table in order to obtain a constant level. The power normalization circuit 100 converts the 8 bit PCM signal into a 13-bit liner signal, $x_i$, which is sent to the ADPCM encoder 200 in DSP 20.

For this purpose it is necessary to establish a reference power or energy vector. Since creating a power vector which involves square root operations is more complex, an energy vector was considered adequate for the preferred embodiment in order to adjust the level of the data signal. The energy vector is created by a predetermined computation in the power normalization circuit 100 of DSP 10.

Over a processing window of 256 ms (2048 samples), the energy of a signal at a known level is computed using Equation (1) below.

$$E_K = \sum_{i=1}^{2047} x_i^2 \qquad (1)$$

where $E_K$ represents energy at $-K$ dBmO signal level, and K need not be an integer. In order to smooth out $E_K$ for various types of data signals, e.g., QAM, FSK, DPSK, etc., the calculation shown in Equation (1) is repeated for several signals at $-K$ dBmO level. An average energy value at $-K$ dBmO is obtained by $$\overline{E}_k = (1/n)(E_{k1} + E_{k2} + \ldots + E_{kp}) \qquad (2)$$

$E_{kp}$ represents energy of a type p signal at $-K$ dBmO data signal level and $\overline{E}_k$ represents the average energy vector element for $-K$ dBmO signal level. Equations (1) and (2) are repeated over the expected range of variation, typically from $-11.0$ to $-18.0$ dBmO. To maintain the normalization accuracy to be within 0.5 dB, the $\overline{E}_k$ values have to be calculated in 0.5 dB steps of the signal level from $-11.0$ to $-18.0$ dBmO. The E vector and a corresponding gain adjustment vector G are given in equations (3) and (4).

$$\overline{E} = \begin{bmatrix} \overline{E}_1 \\ \overline{E}_2 \\ \cdot \\ \cdot \\ \overline{E}_{15} \end{bmatrix} \qquad (3)$$

$$G = \begin{bmatrix} G_1 \\ G_2 \\ \cdot \\ \cdot \\ G_{15} \end{bmatrix} \qquad (4)$$

The elements of vector G are selected as follows: If the data signal energy E is such that $\overline{E}_{k-1} < E \leq \overline{E}_K$, then $G_K$ is used to normalize the level. Also if $E > \overline{E}_1$, then $G_1$ is selected for normalization of the signal. In the present invention, the signal is normalized to $-11.0$ dBmO for optimum data rate detector performance.

In general, there is no single technique that will accurately identify the rate of a data signal for all signals. It is therefore, necessary to use different techniques to extract unique characteristics applicable to various modulation schemes used in generating data signals. Typically, modulation schemes employed for the signals referred to above, are FSK, DPSK and QAM. One of the techniques utilized in the data rate detector shown in FIG. 1 is zero-crossing analysis which is performed in digital signal processing chip 10 on the data input signal, (schematically illustrated as block 110 in FIG. 1) Two other techniques i.e., ADPCM level distribution analysis and partial entropy analysis first require the 32 kbit/s ADPCM encoder 200 in digital signal processing chip 20 to convert the 13-bit linear signal $x_i$ from the power normalization circuit 100 in digital processing chip 10 to 4 bit/sample ADPCM. An ADPCM algorithm is used in the ADPCM encoder 200 because it is more discriminating than PCM. The ADPCM samples thus generated are processed in digital signal processing chip 30 for data rate detection according to these two other techniques.

Zero-crossing analysis is used to determine the carrier frequency of the modem in the zero-crossing analyzer 110 of digital processing chip 10. The number of zero-crossings ($N_{zc}$) of the carrier frequency is computed over a 512 ms time window. These zero-crossing computations are done using the 8 bit PCM samples in the data input signal and the computations are performed independent of the normalization of the input signals that takes place in the power normalization circuit 100. As is known in the art, the input signal zero-crossings are independent of the power level of the signal.

The output of the ADPCM encoder 200, which is represented by 4 bit/sample, is used to determine which of the different quantizer levels will be applied. The 4 bit/sample signal is quantized to 16 levels, eight positive and eight negative. Only the magnitude bits of the ADPCM output are used to compute the number of times a particular quantizer level is used. Four counters $C_4$, $C_5$, $C_6$, and $C_7$ receive output of ADPCM encoder 200 and count the number of times quantizer levels 4, 5, 6 and 7 are exercised.

For modem signals employing QAM modulation, the outer quantizer levels 6 and 7 are used more frequently than in other types of modulations. Therefore, a partial level count $L_p$ can be generated in the level occupancy circuit 300 in order to distinguish QAM modem signals (9.6 kbit/s data signals) from other signals where $L_p$ is obtained from Equation 5 below $$L_p = C_6 + C_7 \qquad (5)$$

The rationale behind this type of discrimination of QAM signals is that when the amplitude of the carrier changes from one symbol to the other, the ADPCM quantizer will be fully loaded utilizing the outer levels 6 and 7 more frequently than if the carrier amplitude remained constant. The level distribution analysis is completed in 256 ms.

As stated previously, the number of times each of the ADPCM encoder levels 4, 5, 6 and 7 is exercised, is counted by $C_4$, $C_5$, $C_6$ and $C_7$. These values are received by partial entropy circuit 310 for computing the partial entropy, $E_p$, of the ADPCM output. Only the upper four levels are used in computing the partial entropy which is obtained by using Equations (6) and (7) below $$E_p = - \sum_{i=4}^{7} p_i \log p_i \qquad (6)$$

where $p_i = c_i/2048$   $i = 4, 5, 6, 7$ (7)

A 256 ms window (2048 samples) is used for computing the value of $E_p$.

The partial entropy analysis is effective in discriminating data signals which use the same type of modulation scheme (e.g. DPSK) and the same or a closely related carrier frequency.

The data rate detector, using data signal discriminating techniques described previously, utilizes three DSP chips. Multiple DSPs are used for ease of implementations. However, it is possible to implement the entire data rate detection algorithm including power normalization, ADPCM encoding, data signal discrimination and the data rate detection in a single DSP chip.

Figure 2:
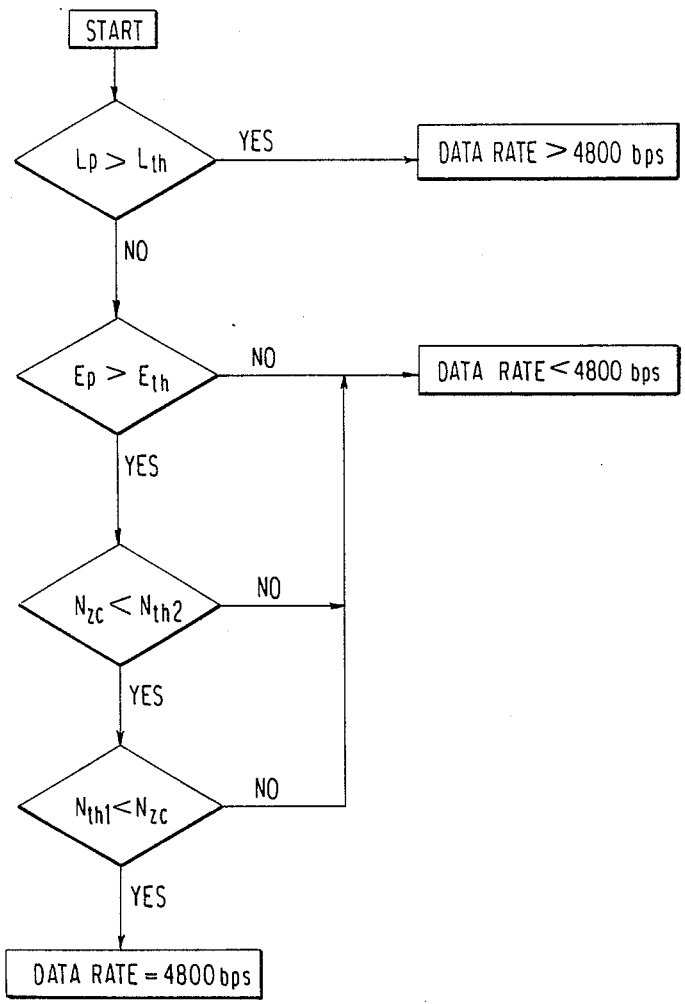
FIG. 2 is a flow chart for explaining the operation of the embodiment of FIG. 1.

The operation of the data rate detector will now be described. FIG. 1 shows the configuration of the data rate detector. In digital signal processing chip 10, the data signal level normalization and zero-crossing analysis is performed by power normalization circuit 100 and zero-crossing analyzer 110, respectively. Circuit 100 yields a 13 bit linear PCM data signal and circuit 110 yields a zero-crossing value $N_{zc}$. In digital signal processing chip 20, the normalized 13-bit linear PCM data signal from the power normalization circuit 100 is then converted to a 4-bit/sample ADPCM signal by a 32 kbit/s ADPCM encoder 200. The 4-bit output from the ADPCM encoder 200 is then received by digital processing chip 30 for the level occupancy and partial entropy calculations over a 256 ms time window. The zero-crossing count $N_{zc}$ is transmitted to a zero-crossing comparator 340 in the digital signal processing chip 30 from the zero-crossing analyzer 110 via the ADPCM encoder 200 in the digital signal processing chip 20. At this time, the level occupancy value $L_p$, the partial entropy value $E_p$ and the number of zero-crossings, $N_{zc}$, available in digital signal processing chip 30 to effect data rate detection. As shown in FIG. 1 and illustrated in flow chart form in FIG. 2, $L_p$ is compared with a threshold $L_{th}$ in a level occupancy detector 320. If $L_p > L_{th}$, then the data rate is greater than 4800 bps. If $L_p \leq L_{th}$, then $E_p$ from the partial entropy circuit 310 is compared with threshold $E_{th}$ in an entropy comparator 330. If $E_p \leq E_{th}$, then the data rate is less than 4800 bps. If $E_p > E_{th}$, then another criterion is used to discriminate for a data rate less than 4800 bps and equal to 4800 bps. This is accomplished by utilizing the zero-crossing value $N_{zc}$ in the zero-crossing comparator 340. If $N_{zc}$ lies between thresholds $N_{th1}$ and $N_{th2}$, then the data rate is 4800 bps. Otherwise the data rate is less than 4800 bps.

The threshold values $L_{th}$, $E_{th}$, $N_{th1}$ and $N_{th2}$ are determined from repeated testing using input signals having various data rates.

What is claimed is:

1. An apparatus for detecting the data rate of input data signals, comprising:
   means for normalizing said input data signals;
   means for calculating the zero-crossing count $N_{zc}$ of said input data signals;
   means for Adaptive Differential Pulse Code Modulation (ADPCM) conversion of the output of said normalizing means to produce an ADPCM output having plural quantization levels;
   a plurality of counting means for counting the number of times each of said quantization levels is used in said ADPCM output;
   means for determining a partial level count $L_p$ of the ADPCM output based on the outputs of fewer than all of said plurality of counting means;
   means receiving at least some of the outputs of said plurality of counting means for determining the partial entropy $E_p$ for said input data signals;
   first means for comparing said partial level count $L_p$ to a threshold level count and providing a first comparison output;
   second means for comparing said partial entropy value $E_p$ to a threshold entropy value and providing a second comparison output; and
   third means for comparing said zero-crossing count $N_{zc}$ to a zero-crossing threshold and providing a third comparison output;
   means for determining said data rate in accordance with said first, second and third outputs.

2. An apparatus as claimed in claim 1, wherein if said partial level count $L_p$ is greater than said threshold level count then an output signal indicating said data rate of said input data signals is greater than a predetermined data rate is generated.

3. An apparatus as claimed in claim 2, wherein if said partial level count $L_p$ is not greater than said threshold level count then said partial entropy value $E_p$ is compared to said threshold entropy value, and if said partial entropy value $E_p$ is not greater than said threshold entropy value, an output signal indicating said data rate of said input data signals is less than said predetermined data rate is generated.

4. An apparatus as claimed in claim 3, wherein if said partial entropy value $E_p$ is greater than said threshold entropy value then said zero-crossing count $N_{zc}$ is compared to a pair of threshold zero-crossings, and if said zero crossing count $N_{zc}$ is greater than a first one of said pair of threshold zero-crossings and less than the other of said pair of threshold zero-crossings, then an output signal indicating said data rate of said input data signals is equal to said predetermined data rate is generated.

5. An apparatus as claimed in claim 4, wherein if said zero crossing count $N_{zc}$ is either not greater than said first one of said pair of threshold zero-crossings or not less than said other of said pair of threshold zero-crossings, then an output signal indicating said data rate of said input data signals is less than said predetermined data rate is generated.

6. An apparatus as claimed in claim 5, wherein a channel encoder is selected based on said output signals.

7. An apparatus as claimed in claim 1, wherein said detecting apparatus is disposed on a plurality of digital signal processing chips.

8. An apparatus as claimed in claim 7, wherein said means for normalizing said input data signals and said means for calculating the zero-crossing count are disposed on a first one of said plurality of digital signal processing chips.

9. An apparatus as claimed in claim 8, wherein said means for ADPCM conversion is disposed on a second one of said plurality of digital signal processing chips.

10. An apparatus as claimed in claim 9, wherein said plurality of counting means, said means for determining a partial level count $L_p$, said means for determining the partial entropy $E_p$ for said input data signals, said first means for comparing said partial level count $L_p$, said second means for comparing said partial entropy value $E_p$, and said third means for comparing said zero-crossing count $N_{zc}$ are disposed on a third one of said plurality of digital signal processing chips.

11. An apparatus as claimed in claim 1, wherein said detecting apparatus is disposed on a single digital signal processing chip.

12. An apparatus as claimed in claim 1, wherein said output of said normalizing means is a 13-bit linear Pulse Code Modulation (PCM) signal.

13. An apparatus as claimed in claim 1, wherein said output of said ADPCM conversion means is a 4 bit/sample ADPCM signal.

14. An apparatus as claimed in claim 13, wherein said plurality of counting means equals four.

15. An apparatus as claimed in claim 14, wherein the outputs of only two of said plurality of counting means are used for determining said partial level count $L_p$.

* * * * *